United States Patent
Donovan et al.

(10) Patent No.: US 11,429,713 B1
(45) Date of Patent: Aug. 30, 2022

(54) ARTIFICIAL INTELLIGENCE MODELING FOR CYBER-ATTACK SIMULATION PROTOCOLS

(71) Applicant: ARCHITECTURE TECHNOLOGY CORPORATION, Eden Prairie, MN (US)

(72) Inventors: Matthew Donovan, Ithaca, NY (US); Paul Nicotera, Ithaca, NY (US); Dahyun Hollister, Ithaca, NY (US); Robert Joyce, Ithaca, NY (US); Judson Powers, Ithaca, NY (US)

(73) Assignee: ARCHITECTURE TECHNOLOGY CORPORATION, Eden Prairie, MN (US)

( * ) Notice: Subject to any disclaimer, the term of this patent is extended or adjusted under 35 U.S.C. 154(b) by 323 days.

(21) Appl. No.: 16/256,810

(22) Filed: Jan. 24, 2019

(51) Int. Cl.
*G06F 21/53* (2013.01)
*G06N 3/04* (2006.01)
*H04L 9/40* (2022.01)
*G06F 21/55* (2013.01)

(52) U.S. Cl.
CPC ............ *G06F 21/53* (2013.01); *G06F 21/552* (2013.01); *G06N 3/04* (2013.01); *H04L 63/1458* (2013.01)

(58) Field of Classification Search
CPC . H04L 63/14; H04L 63/1441; H04L 63/1458; G06F 21/50; G06F 21/52; G06F 21/53; G06F 21/55; G06F 21/552; G06N 3/02; G06N 3/04
See application file for complete search history.

(56) References Cited

U.S. PATENT DOCUMENTS

| | | |
|---|---|---|
| 4,895,518 A | 1/1990 | Arnold et al. |
| 5,115,433 A | 5/1992 | Baran et al. |
| 5,440,723 A | 8/1995 | Arnold et al. |
| 5,601,432 A | 2/1997 | Bergman |
| 5,944,783 A | 8/1999 | Nieten |

(Continued)

FOREIGN PATENT DOCUMENTS

| | | |
|---|---|---|
| CN | 106709613 A | 5/2017 |
| WO | WO-2017/105383 A1 | 6/2017 |

OTHER PUBLICATIONS

"Cybersecurity," U.S. Department of Defense Instruction, No. 8500.01, Mar. 14, 2014, 58 pages, accessible via https://www.esd.whs.mil/Portals/54/Documents/DD/issuances/dodi/850001_2014.pdf.

(Continued)

*Primary Examiner* — Khang Do
(74) *Attorney, Agent, or Firm* — Foley & Lardner LLP

(57) ABSTRACT

The methods and systems disclosed herein generally relate to automated execution and evaluation of computer network training exercises, such as in a virtual environment. A server generates a training system having a virtual attack machine and a virtual target machine where the virtual target machine is operatively controlled by a trainee computer. The server then executes a simulated cyber-attack and monitors/collects actions and responses by the trainee. The server then executes an artificial intelligence model to evaluate the trainee's action and to identify a subsequent simulated cyber-attack (e.g., a next step to the simulated cyber-attack). The server may then train the artificial intelligence model using various machine-learning techniques using the collected data during the exercise.

16 Claims, 5 Drawing Sheets

(56) References Cited

U.S. PATENT DOCUMENTS

| | | | |
|---|---|---|---|
| 5,974,549 A | 10/1999 | Golan | |
| 5,974,579 A | 10/1999 | Lepejian et al. | |
| 6,088,804 A * | 7/2000 | Hill | G06F 21/552 726/25 |
| 6,345,283 B1 | 2/2002 | Anderson | |
| 6,658,481 B1 | 12/2003 | Basso et al. | |
| 6,985,476 B1 | 1/2006 | Elliott et al. | |
| 7,058,968 B2 | 6/2006 | Rowland et al. | |
| 7,107,347 B1 | 9/2006 | Cohen | |
| 7,228,566 B2 | 6/2007 | Caceres et al. | |
| 7,234,168 B2 | 6/2007 | Gupta et al. | |
| 7,317,733 B1 | 1/2008 | Olsson et al. | |
| 7,325,252 B2 | 1/2008 | Bunker et al. | |
| 7,372,809 B2 | 5/2008 | Chen et al. | |
| 7,496,959 B2 | 2/2009 | Adelstein et al. | |
| 7,522,908 B2 | 4/2009 | Hrastar | |
| 7,694,328 B2 | 4/2010 | Joshi et al. | |
| 7,743,074 B1 | 6/2010 | Parupudi et al. | |
| 7,748,040 B2 | 6/2010 | Adelstein et al. | |
| 7,818,804 B2 | 10/2010 | Marceau | |
| 7,886,049 B2 | 2/2011 | Adelstein et al. | |
| 7,925,984 B1 | 4/2011 | Awe et al. | |
| 7,930,353 B2 | 4/2011 | Chickering et al. | |
| 7,962,961 B1 | 6/2011 | Griffin et al. | |
| 8,079,080 B2 | 12/2011 | Borders | |
| 8,156,483 B2 | 4/2012 | Berg et al. | |
| 8,176,557 B2 | 5/2012 | Adelstein et al. | |
| 8,250,654 B1 * | 8/2012 | Kennedy | H04L 41/22 726/22 |
| 8,266,320 B1 | 9/2012 | Bell et al. | |
| 8,296,848 B1 | 10/2012 | Griffin et al. | |
| 8,307,444 B1 | 11/2012 | Mayer et al. | |
| 8,321,437 B2 | 11/2012 | Lim | |
| 8,341,732 B2 | 12/2012 | Croft et al. | |
| 8,407,801 B2 | 3/2013 | Ikegami et al. | |
| 8,433,768 B1 | 4/2013 | Bush et al. | |
| 8,458,805 B2 | 6/2013 | Adelstein et al. | |
| 8,490,193 B2 | 7/2013 | Sarraute Yamada et al. | |
| 8,495,229 B2 | 7/2013 | Kim | |
| 8,499,354 B1 | 7/2013 | Satish et al. | |
| 8,554,536 B2 | 10/2013 | Adelman et al. | |
| 8,862,803 B2 | 10/2014 | Powers et al. | |
| 8,893,278 B1 | 11/2014 | Chechik | |
| 9,076,342 B2 * | 7/2015 | Brueckner | G09B 19/0053 |
| 9,081,911 B2 | 7/2015 | Powers et al. | |
| 9,083,741 B2 | 7/2015 | Powers | |
| 9,137,325 B2 | 9/2015 | Muhunthan et al. | |
| 9,208,323 B1 * | 12/2015 | Karta | G06F 21/577 |
| 9,225,637 B2 | 12/2015 | Ramanujan et al. | |
| 9,280,911 B2 * | 3/2016 | Sadeh-Koniecpol | G06F 21/562 |
| 9,325,728 B1 * | 4/2016 | Kennedy | H04L 63/1433 |
| 9,384,677 B2 | 7/2016 | Brueckner et al. | |
| 9,626,414 B2 | 4/2017 | Kanjirathinkal et al. | |
| 9,882,912 B2 | 1/2018 | Joo | |
| 10,079,850 B1 * | 9/2018 | Patil | H04L 63/1433 |
| 10,083,624 B2 * | 9/2018 | Brueckner | G09B 5/02 |
| 10,291,634 B2 | 5/2019 | Arzi et al. | |
| 10,291,638 B1 | 5/2019 | Chandana et al. | |
| 10,469,519 B2 * | 11/2019 | Irimie | H04L 63/20 |
| 10,540,502 B1 | 1/2020 | Joyce et al. | |
| 10,558,809 B1 | 2/2020 | Joyce et al. | |
| 10,581,868 B2 * | 3/2020 | Kras | G06F 9/30029 |
| 10,686,811 B1 * | 6/2020 | Ehle | H04L 63/1425 |
| 10,749,890 B1 | 8/2020 | Aloisio et al. | |
| 10,803,766 B1 | 10/2020 | Donovan et al. | |
| 10,868,825 B1 * | 12/2020 | Dominessy | H04L 43/065 |
| 10,949,338 B1 | 3/2021 | Sirianni et al. | |
| 11,158,207 B1 * | 10/2021 | Sadeh-Koniecpol | G06F 21/566 |
| 11,257,393 B2 * | 2/2022 | Atencio | A63F 13/822 |
| 2002/0038430 A1 | 3/2002 | Edwards et al. | |
| 2002/0073204 A1 | 6/2002 | Dutta et al. | |
| 2002/0078382 A1 | 6/2002 | Sheikh et al. | |
| 2002/0129264 A1 | 9/2002 | Rowland et al. | |
| 2002/0162017 A1 | 10/2002 | Sorkin et al. | |
| 2003/0056116 A1 | 3/2003 | Bunker et al. | |
| 2003/0182582 A1 | 9/2003 | Park et al. | |
| 2003/0236993 A1 | 12/2003 | McCreight et al. | |
| 2004/0039921 A1 | 2/2004 | Chuang | |
| 2005/0132225 A1 | 6/2005 | Gearhart | |
| 2005/0138413 A1 | 6/2005 | Lippmann et al. | |
| 2005/0165834 A1 | 7/2005 | Nadeau et al. | |
| 2005/0193173 A1 | 9/2005 | Ring et al. | |
| 2005/0193430 A1 | 9/2005 | Cohen et al. | |
| 2005/0203921 A1 | 9/2005 | Newman et al. | |
| 2006/0037076 A1 | 2/2006 | Roy | |
| 2006/0104288 A1 | 5/2006 | Yim et al. | |
| 2006/0109793 A1 | 5/2006 | Kim et al. | |
| 2006/0167855 A1 | 7/2006 | Ishikawa et al. | |
| 2006/0191010 A1 * | 8/2006 | Benjamin | H04L 63/1433 726/23 |
| 2006/0248525 A1 | 11/2006 | Hopkins | |
| 2006/0253906 A1 | 11/2006 | Rubin et al. | |
| 2006/0271345 A1 | 11/2006 | Kasuya | |
| 2007/0055766 A1 | 3/2007 | Petropoulakis et al. | |
| 2007/0112714 A1 | 5/2007 | Fairweather | |
| 2007/0192863 A1 | 8/2007 | Kapoor et al. | |
| 2008/0010225 A1 | 1/2008 | Gonsalves et al. | |
| 2008/0167920 A1 | 7/2008 | Schmidt et al. | |
| 2008/0183520 A1 | 7/2008 | Cutts et al. | |
| 2008/0222734 A1 | 9/2008 | Redlich et al. | |
| 2009/0007270 A1 | 1/2009 | Futoransky et al. | |
| 2009/0144827 A1 | 6/2009 | Peinado et al. | |
| 2009/0150998 A1 | 6/2009 | Adelstein et al. | |
| 2009/0158430 A1 | 6/2009 | Borders | |
| 2009/0164522 A1 | 6/2009 | Fahey | |
| 2009/0208910 A1 * | 8/2009 | Brueckner | G09B 9/00 434/11 |
| 2009/0254572 A1 | 10/2009 | Redlich et al. | |
| 2009/0288164 A1 | 11/2009 | Adelstein et al. | |
| 2009/0319247 A1 | 12/2009 | Ratcliffe, III et al. | |
| 2009/0319249 A1 | 12/2009 | White et al. | |
| 2009/0319647 A1 | 12/2009 | White et al. | |
| 2009/0319906 A1 | 12/2009 | White et al. | |
| 2009/0320137 A1 * | 12/2009 | White | H04L 63/1433 726/25 |
| 2009/0328033 A1 | 12/2009 | Kohavi et al. | |
| 2010/0010968 A1 | 1/2010 | Redlich et al. | |
| 2010/0058114 A1 | 3/2010 | Perkins et al. | |
| 2010/0082513 A1 * | 4/2010 | Liu | G06N 20/00 706/46 |
| 2010/0138925 A1 * | 6/2010 | Barai | H04L 63/1433 726/25 |
| 2010/0146615 A1 | 6/2010 | Locasto et al. | |
| 2010/0284282 A1 * | 11/2010 | Golic | H04L 63/1425 370/242 |
| 2010/0319069 A1 | 12/2010 | Granstedt et al. | |
| 2011/0154471 A1 | 6/2011 | Anderson et al. | |
| 2011/0177480 A1 | 7/2011 | Menon | |
| 2011/0282715 A1 * | 11/2011 | Nguyen | G06Q 10/06 705/7.39 |
| 2012/0210017 A1 | 8/2012 | Muhunthan et al. | |
| 2012/0210427 A1 | 8/2012 | Bronner et al. | |
| 2013/0014264 A1 * | 1/2013 | Kennedy | H04L 41/22 726/25 |
| 2013/0019312 A1 * | 1/2013 | Bell | H04L 63/1441 726/23 |
| 2013/0055404 A1 | 2/2013 | Khalili | |
| 2013/0347085 A1 | 12/2013 | Hawthorn et al. | |
| 2013/0347116 A1 | 12/2013 | Flores et al. | |
| 2014/0046645 A1 * | 2/2014 | White | H04L 41/145 703/13 |
| 2014/0099622 A1 | 4/2014 | Arnold | |
| 2014/0287383 A1 | 9/2014 | Willingham | |
| 2014/0321735 A1 | 10/2014 | Zhang et al. | |
| 2014/0337971 A1 | 11/2014 | Casassa Mont et al. | |
| 2015/0050623 A1 * | 2/2015 | Falash | G07F 9/10 434/38 |
| 2015/0106324 A1 | 4/2015 | Puri et al. | |
| 2015/0193695 A1 * | 7/2015 | Cruz Mota | H04L 63/1425 706/12 |
| 2015/0213260 A1 | 7/2015 | Park | |

(56) References Cited

U.S. PATENT DOCUMENTS

| | | | |
|---|---|---|---|
| 2015/0213730 A1* | 7/2015 | Brueckner | G09B 9/00 434/118 |
| 2015/0339477 A1 | 11/2015 | Abrams et al. | |
| 2016/0028764 A1* | 1/2016 | Vasseur | H04L 63/1416 726/23 |
| 2016/0099953 A1 | 4/2016 | Hebert et al. | |
| 2016/0173495 A1 | 6/2016 | Joo | |
| 2016/0188814 A1 | 6/2016 | Raghavan et al. | |
| 2016/0219024 A1 | 7/2016 | Verzun et al. | |
| 2016/0234242 A1 | 8/2016 | Knapp et al. | |
| 2016/0246662 A1 | 8/2016 | Meng et al. | |
| 2016/0307199 A1 | 10/2016 | Patel et al. | |
| 2016/0330228 A1 | 11/2016 | Knapp et al. | |
| 2017/0032694 A1* | 2/2017 | Brueckner | G09B 19/0053 |
| 2017/0032695 A1* | 2/2017 | Brueckner | G09B 5/00 |
| 2017/0104778 A1* | 4/2017 | Shabtai | G06F 21/552 |
| 2017/0171230 A1 | 6/2017 | Leiderfarb et al. | |
| 2018/0048534 A1 | 2/2018 | Banga et al. | |
| 2018/0068244 A1 | 3/2018 | Vashistha | |
| 2018/0121657 A1 | 5/2018 | Hay et al. | |
| 2018/0124108 A1* | 5/2018 | Irimie | G06N 20/00 |
| 2018/0129805 A1 | 5/2018 | Samuel | |
| 2018/0150554 A1 | 5/2018 | Le et al. | |
| 2018/0159894 A1 | 6/2018 | Reddy et al. | |
| 2018/0191770 A1 | 7/2018 | Nachenberg et al. | |
| 2018/0219887 A1* | 8/2018 | Luo | H04L 63/1425 |
| 2018/0225471 A1 | 8/2018 | Goyal et al. | |
| 2018/0295154 A1* | 10/2018 | Crabtree | G06N 20/00 |
| 2018/0367563 A1 | 12/2018 | Pfleger de Aguiar et al. | |
| 2018/0375892 A1* | 12/2018 | Ganor | G06F 3/04847 |
| 2019/0014153 A1 | 1/2019 | Lang et al. | |
| 2019/0034623 A1* | 1/2019 | Lowry | H04L 63/1483 |
| 2019/0083876 A1* | 3/2019 | Morton | G09B 5/12 |
| 2019/0102564 A1 | 4/2019 | Li et al. | |
| 2019/0164015 A1 | 5/2019 | Jones, Jr. et al. | |
| 2019/0188615 A1 | 6/2019 | Liu | |
| 2019/0222593 A1* | 7/2019 | Craig | H04L 63/1425 |
| 2019/0258953 A1 | 8/2019 | Lang et al. | |
| 2019/0289029 A1* | 9/2019 | Chawla | H04L 63/1425 |
| 2019/0312890 A1* | 10/2019 | Perilli | G06N 20/00 |
| 2019/0356684 A1* | 11/2019 | Sinha | H04L 63/1458 |
| 2019/0370473 A1* | 12/2019 | Matrosov | G06K 9/6256 |
| 2020/0184053 A1* | 6/2020 | Kursun | G06V 40/40 |
| 2020/0201992 A1* | 6/2020 | Hadar | G06F 30/20 |
| 2020/0358803 A1 | 11/2020 | Roelofs et al. | |
| 2021/0168170 A1 | 6/2021 | Asai et al. | |

OTHER PUBLICATIONS

"Cyberspace Operations," U.S. Air Force, Air Force Policy Directive 10-17, accessible via https:/1as.org/irp/doddir/usaf/afpd10-17.pdf, Jul. 31, 2012, 9 pages.

Atighetchi et al., "Metrinome-Continuous Monitoring and Security Validation of Distributed Systems", Journal of Cyber Security and Information Systems vol. II, No. 1, Knowledge Management, Mar. 2014, pp. 20-26.

Balzarotti et al., "The Impact of GPU-Assisted Malware on Memory Forensics: A Case Study", DFRWS 2015, Elsevier, Digital Investigation, vol. 14, 2015, pp. S16-S24.

De Gusmao et al., "Abstract of Cybersecurity risk analysis model using fault tree analysis and fuzzy decision theory", 2018, International Journal of Information Management, pp. 1-3.

Joyce et al., "MEGA: A Tool for Mac OS X Operating System and Application Forensics," Digital Investigation, vol. 5, Elsevier, Proceedings of the Digital Forensic Research Conference, Aug. 11-13, 2008, pp. 583-590.

Libicki, "Cyberdeterrence and Cyberwar," Rand Corporation, Project Air Force, 2009, 240 pages.

Porche III et al., "A Cyberworm that Knows no Boundaries", RAND Corporation, National Defense Research Institute, 2011, 55 pages.

Quinlan et al., "Rose User Manual: A Tool for Building Source-to-Source Translators", Draft User Manual, Version D.9.6a, Lawrence Livermore National Laboratory, Dec. 16, 2015, 169 pages.

Richard III, Golden G., "Memory Analysis, Meet GPU Malware", CERIAS, Oct. 22, 2014, retrieved 2021 from URL: https://www.cerias.purdue.edu/news_and_events/events/security_seminar/details/index/popenihmencsf2v5mggg5ulfd4 (3 pages).

Schneier, "Attack Trees—Schneier on Security", Dr. Dobb's Journal, Dec. 1999, Retrieved from https://www.schneier.com/academic/archives/1999/12/attack_trees.html, 9 pages.

Snyder et al., "Ensuring U.S. Air Force Operations During Cyber Attacks Against Combat Support Systems—Guidance for Where to Focus Mitigation Efforts," RAND Corporation, 2015, 37 pages.

Vasiliadis et al., "GPU-Assisted Malware", 2010 5th International Conference on Malicious and Unwanted Software, 2010, pp. 1-6.

Wikipedia—OpenCL, Mar. 29, 2017, Retrieved from https://en.wikipedia.org/wiki/OpenCL, 23 pages.

"Cybersecurity", U.S. Department of Defense Instruction, No. 8500.01, Mar. 14, 2014, incorporating change effective Oct. 7, 2019, accessible at URL: https://www.esd.whs.mil/Portals/54/Documents/DD/issuances/dodi/850001_2014.pdf (58 pages).

"Identification and Significance of the Problem or Opportunity", Architecture Technology Corporation, Proposal No. F172-D12-0184, Topic No. OSD172-D12, 10 pages (undated).

2015 DFRWS Forensics Challenge, "Submitted Solutions and Source Code Released", GPU Malware Research, retrieved on Mar. 22, 2020 from http://www.cs.uno.edu/-golden/gpumalware-research.html, 5 pages.

ATC-NY, OSD172-D11, F172-D11-0024, Phase 1 SBIR Proposal, "SilverlineRT" Jul. 20, 2017, 16 pages.

ATC-NY, SB172-007, D172-007-0014, Phase I SBIR Proposal, Silverline Human Performance Detection (Silverline-HPD), Jul. 20, 2017 (17 pages).

Baloch et al., "Comparative Study of Risk Management in Centralized and Distributed Software Development Environment", Sci. Int.(Lahore), vol. 26, No. 4, 2014, pp. 1523-1528.

Becker et al., "Applying Game Theory to Analyze Attacks and Defenses in Virtual Coordinate Systems," 41st International Conference on Dependable Systems & Networks (DSN), Jun. 2011, pp. 133-142.

Challagulla et al., "Empirical Assessment of Machine Learning based Software Defect Prediction Techniques", Proceedings of the 10th IEEE International Workshop on Object-Oriented Real-Time Dependable Systems (WORDS'05), Feb. 2-4, 2005, 8 pages.

Crumb, Francis L., "Cyber Security Boot Camp graduates Class of '06", Academy Spirit, vol. 46, No. 33, Aug. 18, 2006, U.S. Air Force Academy, Colorado (1 page).

Edwards et al., "Hajime: Analysis of a decentralized internet worm for IoT devices", RapidityNetworks, Security Research Group, Oct. 16, 2016, pp. 1-18.

Fisher, "Developing Software in a Multicore & Multiprocessor World," Klocwork White Paper, Klocwork.com., Sep. 2010, pp. 1-11.

Home Invasion 2.0, "Attacking Network-Connected Embedded Devices", retrieved from the internet on Jun. 20, 2018, https://media.blackhat.com/us-13/US-13-Crowley-Home-Invasion-2-0-WP.pdf, 15 pages.

Jones, "Software Defect Origins and Removal Methods," International Function Point Users Group, Capers Jones, Dec. 28, 2012, pp. 1-31.

Joyce, "TrestleHSM: Hierarchical Security Modeling for Naval Control Systems", Phase 1 SBIR Proposal, Topic: N181-051, Unified Cybersecurity System odeling of Naval Control Systems, Architecture Technology Corporation, 25 pages.

Kimball, "Silverline Human Performance Detection (Silverline-HPD)", Phase 1 SBIR Proposal, Architecture Technology Corporation, SB172-007, D172-007-0014, Jul. 20, 2017, 17 pages.

Lathrop et al., "Modeling Network Attacks", 12th Conference on Behavior Representation in Modeling and Simulation, 2003, pp. 401-407 (8 pages).

(56) References Cited

OTHER PUBLICATIONS

Maciel, et al. "Impact of a DDoS Attack on Computer Systems: An approach based on an Attack Tree Model," 2018 Annual IEEE International Systems Conference (SysCon), Vancouver, BC, 2018, pp. 1-8.

Mchale, "The Aegis Combat System's continuous modernization", Military Embedded Systems, Retrieved on Mar. 22, 2020 from http://mil-Embedded.com/articles/the-aegis-combat-systems-continuous-modernization/, 8 pages.

Mclinden, "Segmented Attack Prevention System for IoT Networks (SAPSIN)", Abstract-SBIR Phase 1 Proposal, DoD SBIR 2017.2, Proposal No. F172-D12-0184, Topic No. OSD172-D12, 1 page (undated).

PR Newswire, "ATCorp Releases CSAS-Cloud Security Analysis Suite for Applications in the Cloud", Architecture Technology Corporation, Feb. 26, 2016, 4 pages.

Proposal Author: Matthew Donovan; Topic Name and No. N182-131: Red Team in a Box for Embedded and Non-IP Devices; Title: Automated Cyber Evaluation System, Jun. 30, 2018, 24 pages.

Quinlan et al., "ROSE User Manual: A Tool for Building Source-to-Source Translators", Draft User Manual, Version 0.9.11.115, Lawrence Livermore National Laboratory, Sep. 12, 2019 (337 pages).

Rahman et al., "Defect Management Life Cycle Process for Software Quality Improvement," World Academy of Science, Engineering and Technology International Journal of Computer and Information Engineering, vol. 9, No. 12, 2015 3rd International Conference on Artificial Intelligence, Modelling and Simulation, Nov. 24, 2015, pp. 241-244.

Richard III, "Memory Analysis, Meet GPU Malware", University of New Orleans, CERIAS, Oct. 22, 2014, retrieved from URL: http://www.cerias.purdue.edu/news_and_events/events/security_seminar/details/index/popenihmencsf2v5mggg5ulfd4 (2 pages).

Robbio, "How Will AI Impact Software Development?", Forbes Technology Council, Aug. 31, 2017, retrieved on Mar. 23, 2020 from https://www.forbes.com/sites/forbestechcouncil/2017/08/31/how-will-ai-impact-software-development/#325be7e7264d, 16 pages.

ROSE: Main Page, Lawrence Livermore National Laboratory, retrieved on Mar. 23, 2020 from http://rosecompiler.org/ROSE_HTML_Reference/, 3 pages.

Shiva et al., "Game Theory for Cyber Security," Proceedings of the Sixth Annual Workshop on Cyber Security and Information Intelligence Research, Article No. 34, Apr. 2010, 10 pages.

Sirianni, "A19-080 Cyber Security Tool Kits For Engineers and Soldiers," Phase 1 SBIR Proposal, Architecture Technology Corporation, 24 pages (undated).

Sironi et al., "Metronome: Operating System Level Performance Management via Self-Adaptive Computing", DAC 2012, Jun. 3-7, 2012, pp. 856-865.

Wu et al., "An Attack Modeling Based on Hierarchical Colored Petri Nets", 2008 International Conference on Computerand Electrical Engineering, Phuket, 2008, pp. 918-921.

Xie et al., "Security Analysis on Cyber-Physical System Using Attack Tree", 2013 Ninth International Conference on Intelligent Information Hiding and Multimedia Signal Processing, IEEE Computer Society, IEEE, 2013, pp. 429-432, DOI: 10.1109/IIH-MSP.2013.113 (4 pages).

Xu et al., "A Minimum Defense Cost Calculation Method for Cyber Physical System", 2019 Seventh International Conference on Advanced Cloud and Big Data (CBD), IEEE, 2019, pp. 192-197, DOI: 10.1109/CBD.2019.00043 (6 pages).

Xu et al., "Attack Identification for Software-Defined networking based on attack trees and extension innovation methods," 2017 9th IEEE Intl. Con. on Intelligent Data Acquisition and Advanced Computing Systems: Technology and Applications (IDAACS), Bucharest, 2017, pp. 485-489.

* cited by examiner

ARTIFICIAL INTELLIGENCE MODELING FOR CYBER-ATTACK SIMULATION PROTOCOLS

CROSS REFERENCE TO RELATED APPLICATIONS

This application is related to U.S. Pat. Nos. 10,083,624 and 9,076,342, each of which is incorporated by reference in its entirety.

TECHNICAL FIELD

This application relates generally to cyber-attack simulations and training. More specifically, this application relates to artificial intelligence modeling of cyber-attack simulation protocols.

BACKGROUND

As the sophistication of cyber-adversaries continues to grow, cyber-security experts and technicians must continually train and practice to adapt to more sophisticated and novel cyber-attack techniques. However, existing cyber-security training methodologies and systems do not adequately engage cyber-security experts and technicians, thereby failing to motivate them to maintain their proficiency. For instance, some existing training method and systems that provide independent training typically use "canned" and "pre-scripted" exercises. These exercises execute the same cyber-attack scenarios every time and are not effective because users typically anticipate these pre-scripted scenarios. Therefore, trainees may not be fully engaged. Some other existing training systems use "live" exercises that utilize subject matter experts in the role of adversary (e.g., "red team exercises"). These methods are highly dynamic and immersive. However, even though these exercises are effective and engaging, these exercises require significant time and money to plan and execute, which is undesirable.

SUMMARY

For the aforementioned reasons, there is a need to develop an immersive, adaptive, and unpredictable cyber-security training system and method. The simulated red team exercises disclosed herein perform/simulate real-world cyber-attack activities including network scanning, phishing, and direct attack (e.g., denial of service), monitor trainee responses, and modify its actions (e.g., the method of attack) based on the trainee's performance. Methods, systems, and embodiments disclosed herein save time and money because subject matter experts only need to define initial exercise conditions. Once an exercise is initiated, the disclosed training methods and systems can function autonomously adapting the training exercise based on trainee performance.

In an embodiment, a method comprises executing, by a server, a cyber-attack simulation protocol causing a virtual attack machine to engage in a simulated cyber-attack against a virtual target machine, where a user computer is configured to input a response to the execution of the cyber-attack simulation protocol on the virtual target machine, and the simulated cyber-attack corresponding to an electronic file comprising a set of rules; collecting, by the server, data associated with the cyber-attack simulation protocol by continuously monitoring the virtual target machine, virtual attack machine, and responses inputted by the user computer; executing, by the server, an artificial intelligence model using the collected data, the artificial intelligence model configured to receive the collected data, analyze the collected data using historical cyber-attack data and the set of rules, and determine a subsequent cyber-attack action for the virtual attack machine in the cyber-attack simulation protocol; and executing, by the server, the subsequent cyber-attack action by the virtual attack machine against the virtual target machine.

In another embodiment, a computer system comprises a virtual target machine; a virtual attack machine; a user computer in communication with the virtual target machine; a server configured to instantiate the virtual target machine and the virtual attack machine, the server in communication with the user computer, wherein the server is configured to: execute a cyber-attack simulation protocol causing the virtual attack machine to engage in a simulated cyber-attack against the virtual target machine, where the user computer is configured to input a response to the execution of the cyber-attack simulation protocol on the virtual target machine, the simulated cyber-attack corresponding to an electronic file comprising a set of rules; collect data associated with the cyber-attack simulation protocol by continuously monitoring the virtual target machine, virtual attack machine, and responses inputted by the user computer; execute an artificial intelligence model using the collected data, the artificial intelligence model configured to receive the collected data, analyze the collected data using historical cyber-attack data and the set of rules, and determine a subsequent cyber-attack action for the virtual attack machine in the cyber-attack simulation protocol; and execute the subsequent cyber-attack action by the virtual attack machine against the virtual target machine.

BRIEF DESCRIPTION OF THE DRAWINGS

Non-limiting embodiments of the present disclosure are described by way of example with reference to the accompanying figures, which are schematic and are not intended to be drawn to scale. Unless indicated as representing the background art, the figures represent aspects of the disclosure.

DETAILED DESCRIPTION

Figure 1A:
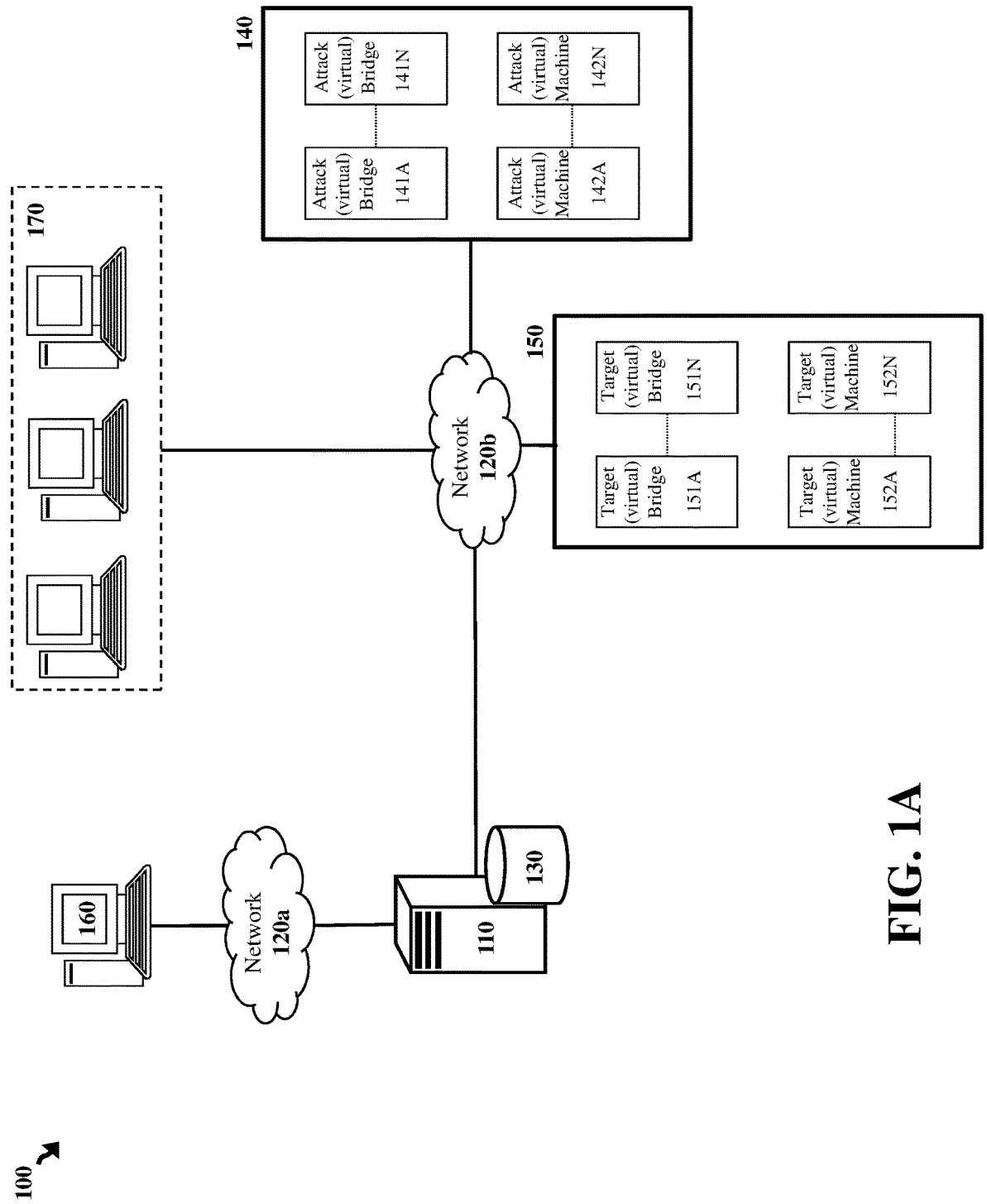
FIGS. 1A-B illustrates components of a cyber-attack training computer system, according to an embodiment.

Reference will now be made to the illustrative embodiments depicted in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one skilled in the relevant art and having possession of this disclosure, are to be considered within the scope of the subject matter disclosed herein. Other embodiments may be used and/or other changes may be made without departing from the spirit or scope of the present disclosure. The illustrative embodiments described in the detailed description are not meant to be limiting of the subject matter presented.

FIG. 1A is a block diagram illustrating a cyber-attack training computer system 100 that includes a monitoring computer 160, a virtual attack machine 140, a virtual target machine 150, trainee computers 170, and an analytics server 110 and its database 130 according to one embodiment. The above-mentioned components may be connected to each other through a networks 120a-b (collectively, networks 120). Non-limiting examples of the networks 120 may include private or public LAN, WLAN, MAN, WAN, and the Internet.

The networks 120 may include both wired and wireless communications according to one or more standards and/or via one or more transport mediums. The communication over the networks 120 may be performed in accordance with various communication protocols such as Transmission Control Protocol and Internet Protocol (TCP/IP), User Datagram Protocol (UDP), and IEEE communication protocols. In one example, the networks 120 may include wireless communications according to Bluetooth specification sets, or another standard or proprietary wireless communication protocol. In another example, the networks 120 may also include communications over a cellular network, including, e.g., a GSM (Global System for Mobile Communications), CDMA (Code Division Multiple Access), and EDGE (Enhanced Data for Global Evolution) network. As described below, the network connecting the monitoring computer 160 to the analytics server 110 (network 120a) may be different than the network connecting the virtual target machine 150, virtual attack machine 140, and/or trainee computers 170 to the analytics server 110 (network 120b).

In an embodiment of the cyber-attack training computer system 100, virtual attack machine 140 may be configured to engage in a simulated cyber-attack of the virtual target machine 150. One or more trainees operate the trainee computers 170 that are operatively connected to the virtual target machine 150. The trainees are tasked with protecting, or otherwise managing, the virtual target machine 150 during the simulated cyber-attack protocol executed by the analytics server 110. The virtual attack machine 140 may automatically respond to actions taken by the trainee in an intelligent fashion. Throughout the simulated cyber-attack, the analytics server 110 may continuously and/or periodically collect trainee behaviors and interactions (e.g., responses submitted/performed by the trainees). Furthermore, the analytics server 110 may evaluate the collected data during the exercise and score each trainee's skills. Trainees may include network administrators, first responders, and/or digital forensics investigators.

In some configurations, the monitoring computer 160, virtual attack machine 140, and virtual target machine 150 are housed within a common computing device, such as a personal computer or a virtual server (e.g., the analytics server 110). In some configurations, the monitoring computer 160, virtual attack machine 140, and virtual target machine 150 are housed within two or more separate computing devices. For instance, a trainee computer 170 may instantiate the virtual target machine 150. As shown in FIG. 1A, trainee computers 170 are communicatively coupled to the virtual target machine 150 via the network 120b. In some embodiments, the analytics server 110 may connect the trainee computers 170 using a secure and isolated network 120b (e.g., sandboxing) to ensure that trainee actions are contained and do not affect other computing systems connected to the analytics server 110.

The trainee computers 170 and virtual target machine 150 may be housed in a common computing device, while in another embodiment, trainee computers 170 and virtual target machine 150 are housed in separate computing devices. Trainee computers 170 may also be communicatively coupled to the virtual target machine 150 through a public network, such as the Internet, such that the trainee may remotely log into virtual target machine 150 during a training exercise. Trainee computers 170 are capable of sending commands and instructions to virtual target machine 150 to control various functions of virtual target machine 150. Trainee computers 170 are also capable of receiving information from virtual target machine 150 via the analytic server 110. For instance, the analytics server 110 may generate and transmit a status report (during the simulated attack) of the virtual target machine 150 to the trainee computers 170.

Because the monitoring computer 106 is coupled to the analytics server 110 via the network 120a, it is able to access resources that may be used during training exercises. The monitoring computer 160 may control various aspects of cyber-attack training computer system 100 and the training exercises that are performed. Monitoring computer 160 may also be capable of controlling and/or monitoring one or more functions of the virtual attack machine 140 and the virtual target machine 150. The monitoring computer 160 may also be capable of configuring these systems prior to initiation of training exercises. Monitoring computer 160 may include one or more control machines each comprising virtual machines that are part of, and operate in conjunctions with, the monitoring computer 160.

Virtual attack machine 140 may be configured to initiate one or more simulated cyber-attacks of the virtual target machine 150. The virtual attack machine 140 may include one or more attack machines 142A-142N. In one embodiment, attack machines 142A-142N each comprise physical machines within virtual attack machine 140, while in another embodiment, attack machines 142A-142N each comprise virtual machines that are part of, or operate within, virtual attack machine 140 or the analytics server 110. Therefore, the virtual attack machine 140, as used herein, may refer to a collection of physical and/or virtual machines configured to simulate a computing system attacking the virtual target machine.

The virtual attack machine 140 may also include one or more network bridge devices 141A-141N. In one embodiment, network bridge devices 141A-141N may each comprise virtual bridges that are part of, and operate within, virtual attack machine 140. Similarly, the virtual target machine 150 may include one or more target machines 152A-152N. In one embodiment, target machines 152A-152N may each comprise physical machines, while in another embodiment, target machines 152A-152N may each comprise virtual machines that are part of, or operate within, virtual target machine 150 or the analytics server 110. Therefore, the virtual target machine 150, as used herein, may refer to a collection of physical and/or virtual machines configured to simulate a computing system being attack by the virtual attack machine. The virtual target machine 150 may include one or more network bridge devices 115A-115N. In one embodiment, network bridge devices 151A-151N each comprise virtual bridges that are part of, and operate within the virtual target machine 150.

During a given training exercise operated within the cyber-attack training computer system 100, scenario traffic may be exchanged between the analytics server 110 (virtual attack machine 140 and/or the virtual target machine 150), trainee computers 170, and monitoring computer. For example, the analytics server 110 may send configuration information as scenario traffic to the virtual attack machine 140 and/or virtual target machine 150. The virtual attack machine 140 may then send scenario traffic in the form of attack information to the virtual target machine 150. The analytics server 110 may then generate and transmit a status report notifying of the above-mentioned actions to the trainee computers 170. In response, the trainee computers 170 (through the virtual target machine 150) may send response or other scenario traffic back to virtual attack machine 140.

In some configurations, scenario traffic that is exchanged between the analytics server 110, attack computing system 140, virtual target machine 150, and the trainee computers 170 is exchanged across a first communication channel that is separate and distinct from the network 120*b*. This first communication channel may utilize one or a mix of physical and virtual networking features that are set up for sending or receiving scenario traffic on the analytics server 110, virtual attack machine 140, and virtual target machine 150. Physical network cards and crossover cables may link physical machines, and virtual network interfaces and virtual bridges may link virtual machines inside a physical machine. As described above, the monitoring computer 160 may monitor the scenario traffic.

Scenario traffic may include both hostile and benign background traffic. For example, the virtual attack machine 140 may send both hostile and benign traffic to virtual target machine 150 during the course of an exercise. The trainee may be responsible for correctly identifying and discriminating between the hostile and benign traffic in order to properly defend the virtual target machine 150.

During the training exercise within cyber-attack training computer system 100, out-of-band data is also exchanged between the analytics server 110, virtual attack machine 140, virtual target machine 150, and trainee computers 170. This out-of-band data may include observation and control data. In one embodiment, the out-of-band data is not visible to a trainee and does not interfere with scenario traffic that is exchanged between systems 110, 140, and 150. The analytics server 110 may monitor and observe the progress, events, responses, or status of virtual attack machine 140 and virtual target machine 150 by processing portions of the out-of-band data. Both virtual attack machine 140 and virtual target machine 150 may transmit out-of-band data pertaining to the training exercise to the analytics server 110 for processing. The analytics server 110 may also provide control information to virtual attack machine 140 and virtual target machine 150 as out-of-band data. For example, based upon observation of a training exercise, the analytics server 110 may modify one or more aspects of the exercise by sending control information (e.g., subsequent steps) to one or both of virtual attack machine 140 and virtual target machine 150 using out-of-band data. In another example, the analytics server 110 may modify the attack scenario in real-time or in near real-time based on training responses and the monitored/collected data.

Out-of-band data may be exchanged across a second communication channel that is separate and distinct from network 120*b*. In one embodiment, this second communication channel for out-of-band data may utilize predefined or preconfigured ports that are set up for sending or receiving out-of-band data from the analytics server 110 and/or monitoring computer 160. For example, monitoring computer 160 may use a predefined physical (e.g., serial) or logic port that is reserved for sending or receiving out-of-band data.

The virtual attack machine 140 (via the analytics server 110) may be capable of dynamically and/or intelligently responding to actions taken by target computer system 150. For example, if, in one training scenario or exercise, the virtual attack machine 140 initiates one type of a simulated attack, such as a denial-of-service attack, on the target computer system 150, a trainee operating one of the trainee computers 170 may cause the virtual target machine 150 to respond, or take action, in a particular fashion in an attempt to handle the denial-of-service attack. After an exchange of scenario traffic between target computer system 150 and virtual attack machine 140, the virtual attack machine 140 may use one or more of its attack machines 142A-142N to dynamically counter the particular actions taken by virtual target machine 150. In such fashion, the virtual attack machine 140 is capable of adapting its behavior and attack actions based upon the responses of virtual target machine 150 using both scenario traffic data and out-of-band observation data. This functionality will be described in more detail below.

The analytics server 110 may provide, at least partially, automated evaluation and feedback control, which may be visible via a dashboard displayed on the monitoring computer 160. During, or at the end of, a training exercise, cyber-attack training computer system 100 is capable of providing evaluation and feedback to the trainee and/or to the instructor based upon actions taken and results achieved. The analytics server 110 may be capable of providing such feedback to trainee computers 170 as well.

Thus, cyber-attack training computer system 100 may provide tactical-level training exercises for computer network defense activities. Potential trainees may include network administrators, first responders, and/or digital forensics investigators. Cyber-attack training computer system 100 may be used for various purposes, such as to train students, to test skills of applicants during examination, to evaluate certain network communication protocols, to rehearse certain scenarios, or to provide a training system for team exercises.

Figure 1B:
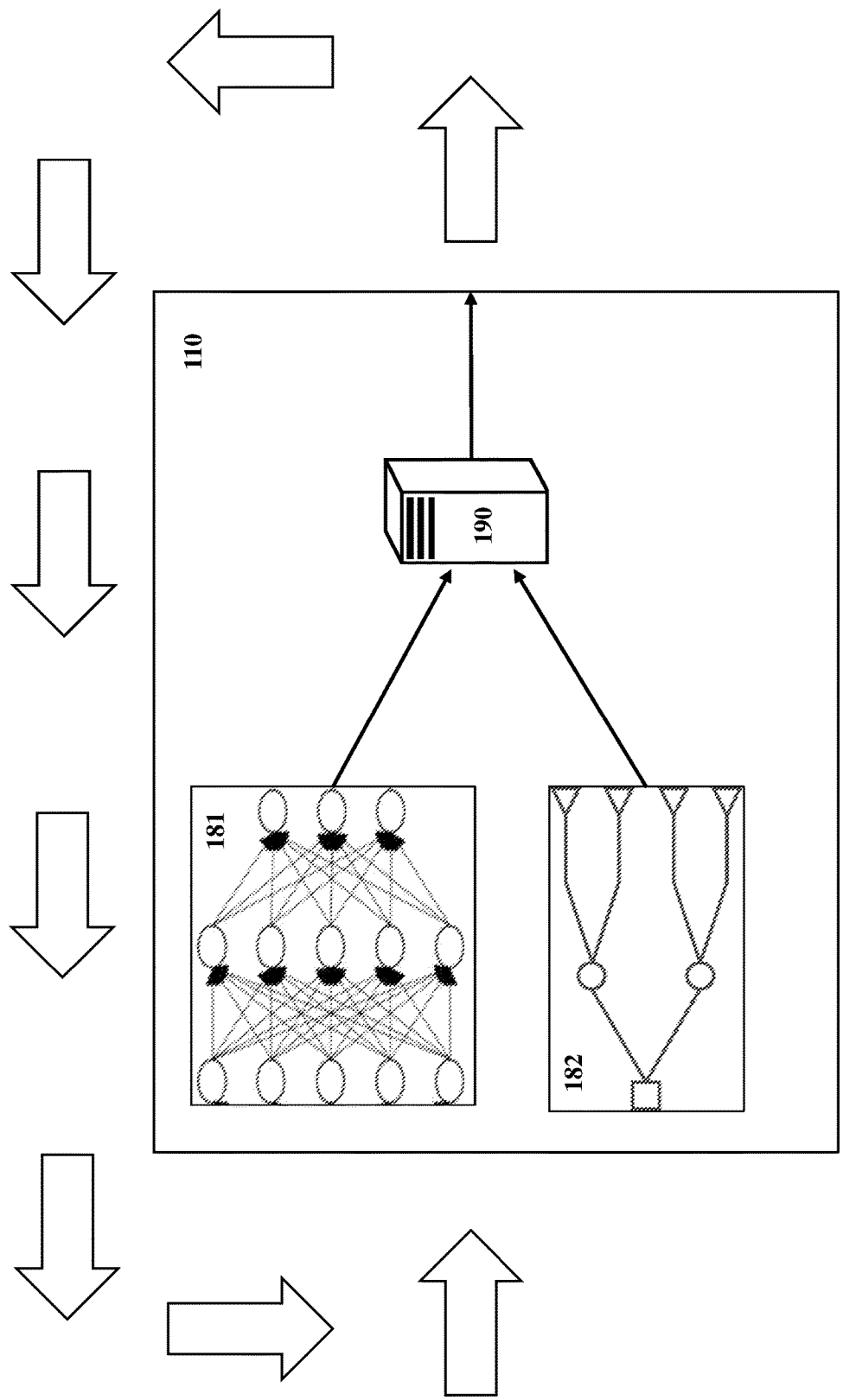

FIG. 1B illustrates operations of the analytics server 110, as described in FIG. 1A. In addition to the virtual target machine 150 and the virtual attack machine 140 described above, the analytics server 110 may comprise three separate modules: the AI model 181, expert system 182, and actor manager module 190. In operation, the analytics server 110 may collect/monitor data associated with the simulated cyber-attack (e.g., trainee actions in response to the simulated cyber-attack). Using the collected data, the analytics server 110 may evaluate the trainee (e.g., generate a score for the trainee's actions) and/or identify a next step for the simulated cyber-attack. The analytics server 110 may execute the AI model 181, the expert system 182, or both to accomplish this task.

As described below, the AI model 181 may comprise one or more neural networks arranged and configured in accordance with a dataset representing historical data. The analytics server 110 may generate the AI model 181 to codify responses to known defenses to cyber-attack actions. For instance, when training the AI model 181, the analytics server 110 may generate a training dataset comprising historical data, such as previous cyber-attacks (real or simulated). The analytics server 110 may then train (e.g., arrange or configure) the neural network accordingly. In some embodiments, each node within the neural network may correspond to an attribute/action of the cyber-attack or responses performed by subject matter experts and/or trainees. When executing the AI model 181, the analytics server 110 may input the monitored data (e.g., trainee actions) whereby the AI model 181 can identify a subsequent step (e.g., a next action to be performed by the virtual attack machine). In some embodiments, the AI model 181 can also evaluate the collected data and generate a score corresponding to the trainee actions.

As described below, the expert system 182 may represent one or more decision trees and/or predetermined algorithms. The decision tree may be a pre-generated list of rules and algorithms describing a progression of a simulated cyber-attack. For instance, the expert system 182 may be a decision tree where each node/leaf represents a cyber-attack action performed by the virtual attack machine or a response performed/submitted by a trainee computer 170. The nodes/leafs of the decision trees may be interconnected in accordance with a predetermined algorithm logic that simulate one or more cyber-attack scenarios.

In embodiments where the analytics server 110 executes the AI model 181 and the expert system 182, the analytics server 110 may also utilize the actor manager module 190. For instance, the actor manager module 190 may receive input from the AI model 181 and expert system 182 to determine a final course of action for the red team simulation (e.g., the actors). The analytics server 110 may utilize the actor manager module 190 to reconcile a difference between incompatible results achieved as a result of executing the AI model 181 and the expert system 182. For instance, when the AI model 181 and the expert system 182 generate different subsequent actions (or different scores), the analytics server 110 may input the generated subsequent actions into the actor manager module 190, whereby the actor manager module 190 determines a single subsequent action (e.g., final subsequent action). The actor manager module 190 may use additional AI techniques such as machine-learning algorithms to evaluate the trainee performance and/or generate trainee scores. As illustrated, the out of the actor manager module 190 may be fed back into the AI model 181, thereby reconfiguring the AI model 181 or "training" the model.

Figure 2:
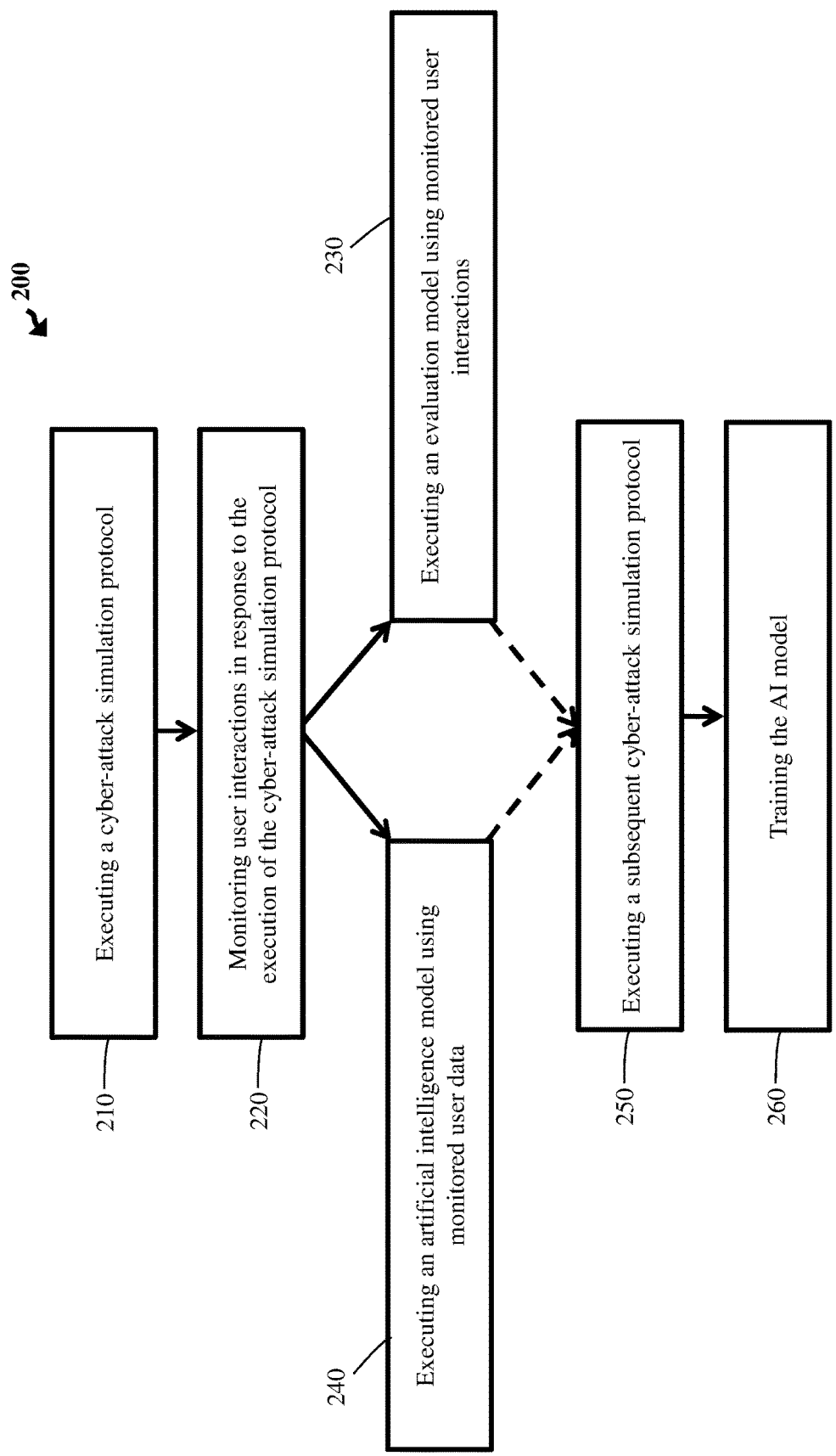
FIG. 2 is a flow diagram of a process executed by a cyber-attack training computer system, according to an embodiment.

FIG. 2 illustrates a flow diagram of a process executed by a cyber-attack training computer system, according to an embodiment. The method 200 includes steps 210-260. However, other embodiments may include additional or alternative execution steps, or may omit one or more steps altogether. Furthermore, the method 200 is described as being executed by a server, similar to the analytics server described in FIGS. 1A-B. However, in some embodiments, steps may be executed by any number of computing devices operating in the distributed computing system described in FIGS. 1A-B. For instance, part or all the steps described in FIG. 2, may be locally performed by one or more user computing devices (e.g., trainee computing device).

At step 210, the analytics server may execute a cyber-attack training protocol. The analytics server may execute, in a training computer system, a cyber-attack simulation protocol, the training computer system comprising a monitoring system, a virtual attack machine, and a virtual target machine that are each executable by one or more processors, the cyber-attack simulation protocol causing the virtual attack machine to engage in a simulated cyber-attack against the virtual target machine, the virtual target machine being operated by one or more trainee computers, the simulated cyber-attack corresponding to an electronic file comprising a set of rules. An example of a simulated cyber-attack is further described in FIGS. 3A-B.

In order to efficiently execute the cyber-attack training protocol, the analytics server may first generate (e.g., instantiate and/or model) the training computer system. The training computer system may include a virtual target machine and virtual attack machine. For instance, the analytics server may virtually model a virtual target machine and a virtual attack machine. The virtual target machine may be the system that is to be defended by the trainee computers, according to one embodiment. The virtual attack machine may be the virtual system that generates attacks and benign background traffic against the virtual target machine. Thus, systems specific to the cyber-attack protocol exercise may be modeled differently each time. The target and virtual attack machines may be modeled to include various machines, bridges, network connections, or other components. Furthermore, as described above, the analytics server may operatively/functionally control the virtual target machine and/or virtual attack machine. For instance, the analytics server may host/execute these systems. In some other configurations, the systems may be hosted locally on a trainee computer and/or other computers.

Different cyber-attack scenarios may be stored on a database in different electronic files having a sequence of steps simulating a cyber-attack. Any given training exercise may include one or more training scenarios. These electronic files may include various scenarios in which the virtual attack machine engages in a simulated cyber-attack of the virtual target machine. For instance, different scenarios define different data packets to be transmitted (or simulated to be transmitted) where these data packets may be hostile and/or benign to the virtual target machine. The training computer system may also implement free-form exercises. In this embodiment, the analytics server may support defining and executing a scenario as a state machine with rules that are mapped into real actions inside of a virtual machine. The concept supports multi-staged attacks and attack changes that can be made in response to real-time user actions.

In some configurations, the analytics server may generate the virtual training system using virtual network of the virtual machines overlaid on a physical network of physical host(s). The analytics server may also identify/create a network topology of target machines, target bridges of the virtual target machine, attack machines, and attack bridges. The virtual training system may be linearly scalable, heterogeneous, and recoverable from errors due to mistakes or intentional misuse. Furthermore, the virtual training system can be configured, modified, and managed through a GUI (graphical user interface) front-end interface to which virtualization-level details are transparent. In some configurations, the analytics server may provide a monitor/observer the option to customize the scenario and/or monitor the progression of the scenario by viewing/monitoring the scenario in real-time or near real-time. Furthermore, the analytics server may also isolate the virtual system from other networks when executing potentially dangerous scenarios.

In operation, the analytics server may receive a selection of a scenario from an administrator computer or a monitoring computer where the selection identifies an electronic file having at least an initial scenario that describes a cyber-attack simulation. In some embodiments, the analytics server may automatically select scenario based on predetermined attributes, for example, received from an administrator or a user of the monitoring computer. Upon identifying a simulated attack scenario, the analytics server may execute the simulated attack whereby the virtual attack machine transmits data packets (hostile and/or benign) to the virtual target machine in accordance with the predetermined rules of the electronic file.

As step 220, the analytics sever may monitor user interactions in response to execution of the cyber-attack simulation protocol. The analytics server may collect information associated with the cyber-attack simulation protocol by continuously monitoring the training computer system and responses submitted from the one or more trainee computers. As a part of the execution of the cyber-attack protocol, the analytics server may monitor how the trainee computers react (e.g., by monitoring inputs and interactions of the trainees) in response to execution of different cyber-attack scenarios.

The analytics server may also process one or more monitored actions. As described previously, the trainees use trainee computers during the training exercise to perform actions on the virtual target machine. These actions are monitored and processed by the analytics server. In one embodiment, the analytics server causes the one or attack machines to process the trainee actions. The analytics sever may capture, record, or otherwise store the monitored trainee actions in one or more databases as an audit log or the database illustrated in FIG. 1.

The actual scenario traffic may be transmitted by virtual target machine to virtual attack machine or vice versa. In addition to the analytics server recording this information, which is based upon the trainee's actions, the trainee may also record feedback in the trainee's computer or a local database. For instance, a trainee may record notes regarding a response to a simulated cyber-attack. In a non-limiting example, the analytics server may display a GUI having one or more inputs fields specifically inquiring reasoning behind a specific user action in response to a simulated attack. As described below, the analytics server may analyze this information when evaluating the cyber-attack protocol, the trainees' skills, and/or determining a next step for the cyber-attack simulation.

The information collected by the analytics server may include actively collected information (active feedback data) and passively collected information (passive feedback data). Actively collected information may include information about a trainee's actions, such as logs of the trainee's activities or user history, the direct consequences of the trainee's actions on system state (e.g., virtual training system and/or the virtual target machine), and the indirect consequences of the trainee's actions as captured by system metrics. The analytics server may collect the actively collected information by gathering data directly from machines (e.g., attack machines and target machines), by collecting data packets transmitted using the networks (e.g., data in and out of the virtual training system, such as the virtual target machine and the virtual attack machine), and/or by collecting data inputted by the monitoring computer.

Passively collected data may include information related to direct state knowledge based upon receipt of information from automated participant(s) (e.g., by knowing an automated attacker's state), and includes observations and conclusions from human participant(s) monitoring the cyber-attack protocol or the trainees. A trainee's state of mind may include the trainee's observations and conclusions during an exercise. This type of information is gathered using a generalized "electronic lab notebook," similar in concept to incident reports commonly used by security professionals, according to one embodiment. The lab notebook may provide both novice and expert interfaces, which are linked to a back-end database (e.g., the database shown in FIG. 1) that ensures data integrity and supports the queries necessary for auto-evaluation, according to one embodiment. In one embodiment, the analytics server may collect the passively collected information by gathering data directly from machines or by collecting data of the data packets within the networks (e.g., data in and out of the virtual system) or by collecting data from the trainee computers.

In a non-limiting example, the analytics server may use dissolvable software agents to collect information about the way the attack/target machines change and operate, as a trainee performs tasks and modifies system settings. For example, changing an insecure web server to use encryption (e.g., HTTPS) requires changing both the web server software configuration and the network firewall, because HTTPS uses a different network port than HTTPS. In addition to verifying that port 443 is accessible and uses HTTPS, the analytics server can also verify that port 80 either does not respond or responds with a redirect to the HTTPS site.

At steps 230 and 240, the analytics server may evaluate the monitored actions. The analytics server may also execute an artificial intelligence model using the collected information, the artificial intelligence model configured to receive the collected information, analyze the collected information using historical cyber-attack data and the set of rules, and determine a subsequent cyber-attack action. The analytics server may also execute an evaluation protocol that does not involve artificial intelligence modeling. In some embodiments, the analytics server may use both of the above-described evaluation processes in order to evaluate the trainees' response and the collected data.

At step 230, the analytics server may execute an evaluation protocol/model to valuate the collected/monitored data. The evaluation protocol may be a set of predetermined rules. For instance, the analytics server may execute a program that automatically evaluates the trainees' responses to a simulated cyber-attack. In some configurations, the analytics server may use a live method where a human user monitors the trainees' actions and inputs an evaluation score. In one embodiment, participant evaluator is capable of monitoring, and also recording, various aspects of the trainees' performance during a training exercise. Participant evaluator is capable of evaluating both the performance of human participants as well as the performance of automated participants (such as an automated attacker or defender) during one or more training exercises. Performance evaluation of automated participants may aid in the evaluation of automated protocols that are used by such automated participants. Real-time monitoring of network-based training exercises have been fully described in U.S. Pat. No. 10,083,624, which is fully incorporated herein.

The analytics server may use monitored/collected information, which may include one or more portions of actively collected information and/or one or more portions of passively collected information, to provide automated evaluation functionality. As described above, an expert system module of the analytics server may execute the evaluation model. The expert system module of the analytics server (also referred to herein as the expert system) may use an evaluation protocol to emulate the decision-making process of the red team. When creating a new exercise (e.g., when generating different scenarios in the electronic files), the analytics server can define simulated red team actions as well as expected responses from the trainees. The actions and expected trainee responses are translated into observer and actor agents during the exercise. As the trainee responds to various attacks or takes actions that improve the security of the virtual target machine, the expert system determines possible responses that the simulated red team will take. The expert system may also evaluate trainee performances and generate a score based on a set of predetermined rules.

The expert system may be an auto-assessment protocol that executes various scripts to generate real-time feedback and evaluations based on the collected data. In one embodiment, the expert system considers multiple types of assessment data about the trainee during a training exercise, including information about the trainees' actions as well as information about the trainees' state of mind (e.g., situational awareness and the diagnostic process), as recorded by the trainee during the exercise. In addition to using assessment data for auto-evaluation purposes, the expert system may also save a log of all collected data as an audit record, allowing the trainees to appeal auto-evaluation results, if necessary (according to one embodiment).

In a non-limiting example, the expert system may comprise a decision tree having multiple nodes where each node is predefined in accordance with a cyber-attack scenario. For instance, a parent node may refer to a certain action simulating an attack or a benign action performed by the virtual attack machine. The parent note may also include multiple child nodes where each child node corresponds to a predetermined and predefined response to the attack or the benign action performed by the virtual attack machine. Each child node may also correspond to a subsequent action to be performed by the virtual attack machine. Furthermore, each child node may also correspond to an evaluation/score of the trainee's response. Using the decision trees described herein, the analytics server may evaluate the trainee's actions and determine a subsequent step to be performed by the virtual attack machine (e.g., red team counter responses).

At step 240, the analytics server may execute an artificial intelligence model using the collected/monitored data to evaluate a trainee's actions. In some embodiments, the counter-responses may not be directly actionable. For instance, the output of the AI model may be a description (e.g., evaluation) of the input it received and a list of possible counter-responses. When creating a simulated cyber-attack scenario, subject matter experts cannot enumerate all of the possible responses a trainee may have to a given simulated red team action. Furthermore, subject matter expert cannot enumerate all of the ways a trainee could solve a specific problem. Therefore, the decision tree of the expert system may not include all possible responses. For example, if the trainee's network is experiencing a denial of service attack, there may be different ways the trainee could configure the firewall to remedy the attack. As a result, the analytics server may also utilize the AI model in conjunction with the expert system to evaluate trainee performance (e.g., actions) and identify red team counter-response.

As described above, the AI model may comprise one or more neural networks that receive input from the analytics server (e.g., collected/monitored data) to evaluate the trainees' actions and to identify possible red team counter-responses. The one or more neural network may comprise multiple interconnected nodes where each node represents and attributes of a cyber-attack action or a response to one or more cyber-attack actions. The analytics server may generate the neural network using historical training datasets that comprise previously performed cyber-attacks and responses to cyber-attacks. The training data set may correspond to a simulated cyber-attack or a real cyber-attack. While generating the neural network, the analytics server may feed known and historical data (e.g., training data set) to the AI model where the AI model uses machine learning techniques to allocate different attributes and actions to different notes (e.g., fir the curve).

To build the neural network, the analytics server may use industry-standard security tools as well as custom-built actor agents to perform network reconnaissance and attacks against a test network. The analytics server may use observer agents to monitor the effect those tools have on the system under attack. This information will then be normalized and used as input to the neural network and/or the expert system.

In an embodiment, the analytics server may use a random forest modeling technique. Random forest modeling may include several nodal hierarchical structures (e.g., trees). Random forest models for classification may work by fitting an ensemble of decision tree classifiers on sub samples of the data. Each tree may only see a portion of the data, drawing samples of equal size with replacement. Each tree may be configured to only use a limited number of features. By averaging the output of classification across the ensemble, the random forests model can limit over-fitting that might otherwise occur in a decision tree model. In other embodiments, the AI model may incorporate other machine learning techniques, such as gradient boosting, support vector machines, deep neural networks, and logistic regression.

In some configurations, the analytics server may use various techniques to train the neural network and to adapt to various data points and improve the neural network's efficiency and accuracy. For instance, the analytics server may use a supervised machine learning method to train the neural network. Supervised learning is the machine-learning task of learning a function that maps an input to an output based on example input-output pairs. A supervised learning algorithm analyzes the training data and produces an inferred function, which can be used for mapping new examples. In some embodiments, the analytics server may use a linear regression model-to-model cyber-attack actions and responses. This technique is a linear approach to modelling the relationship between a scalar response (dependent variable) and one or more explanatory variables (independent variables). In linear regression modeling, the relationships are modeled using linear predictor functions whose unknown model parameters are estimated from the data.

The analytics server may also use a boosting tree regression technique to evaluate trainee actions. Gradient boosting is a machine-learning technique for regression and classification problems, which produces a prediction model in the form of decision trees. For instance, the analytics server may build binary trees by partitioning the data into two samples at each split node where each node represents a data point corresponding to a simulated cyber-attack. Using the tree (e.g., traversing the tree) the analytics server may predict and evaluate a trainee's action or predict a best subsequent action to be performed by the virtual attack machine when presented with a trainee's action in response to a cyber-attack.

In a non-limiting example, the analytics server may execute the AI model using the collected and monitored data where the AI model analyzes attributes of the already simulated cyber-attack step and actions taken by the trainees. The AI model may also identify a response to the trainees' actions (e.g., counter response). For instance, the virtual target machine may simulate a denial of service scenario by flooding the virtual target machine. In response, a trainee may identify and block the origin of the attack by blocking an IP address associated with a virtual machine of the virtual attack machines. This information may be monitored and collected by the analytics server and may be used to execute the AI model. In response to executing the AI model, the analytics server may identify a best subsequent step to be forging an IP address of the virtual attack machine (e.g., IP address spoofing) and sending additional data packages to the virtual target machine using the new IP address.

At step 250, the analytics server may execute a subsequent cyber-attack simulation protocol (e.g., red team counter-response). The analytics server may determine the subsequent cyber-attack simulation protocol based on the result of executing the evaluation model and/or executing the artificial intelligence model. In some embodiments, the output of the AI model and the evaluation model may be both considered. For instance, as described above an actor manager module of the analytics server may consider the subsequent step identified by the AI model and the subsequent step identified by the evaluation model to determine an appropriate read team counter-response (final course of action). In some embodiments, the actor manager module of the analytics server may use additional AI techniques such as machine-learning algorithms to evaluate the trainee performance, assign the student points, and invoke actors to perform an appropriate response.

In order to determine the final course of action the analytics server may use a set of predetermined rules and preferences when analyzing the subsequent step identified by the AI model and the evaluation model. For instance, when the subsequent step identified by the evaluation model and the AI model are the same, the analytics server executes the subsequent step as the final course of action. However, when the subsequent step identified by the evaluation model is different from the subsequent step identified by the AI model, the analytics server may use the predetermined algorithms and preferences to execute the final course of action.

In some embodiments, a live expert may determine a final course of action. For instance, the analytics server may display an indication corresponding to the subsequent steps identified by the AI model and the evaluation model on a dashboard of the monitoring computer. A subject matter expert may view/analyze the subsequent steps identified and displayed on the dashboard and select a final course of action. The live expert may also input a new course of action to be performed or modify/revise the subsequent steps generated using the AI model and/or the evaluation model.

Upon determining a final course of action, the analytics server may execute the final course of action. As described in step 210, the analytics server may cause/reconfigure the virtual attack machine to execute another cyber-attack simulation protocol and simulate another attack of the virtual target machine.

At step 260, the analytics server may train the AI model based on the final course of action executed. As described above the AI model may use various machine-learning techniques to refine and reconfigure its neural network. When the AI model identifies a subsequent step that is overruled by the analytics server and/or the live subject matter expert, the analytics server may feed the final course of action chosen to the AI model. In this way, the analytics server can reconfigure and back propagate the neural network (e.g., determine an optimal arrangement of neurons), thereby improving the strength and accuracy of the AI model. The data used to train the AI model may include actively and passively collected data during the exercise and data inputted by the subject matter expert.

Figure 3A:
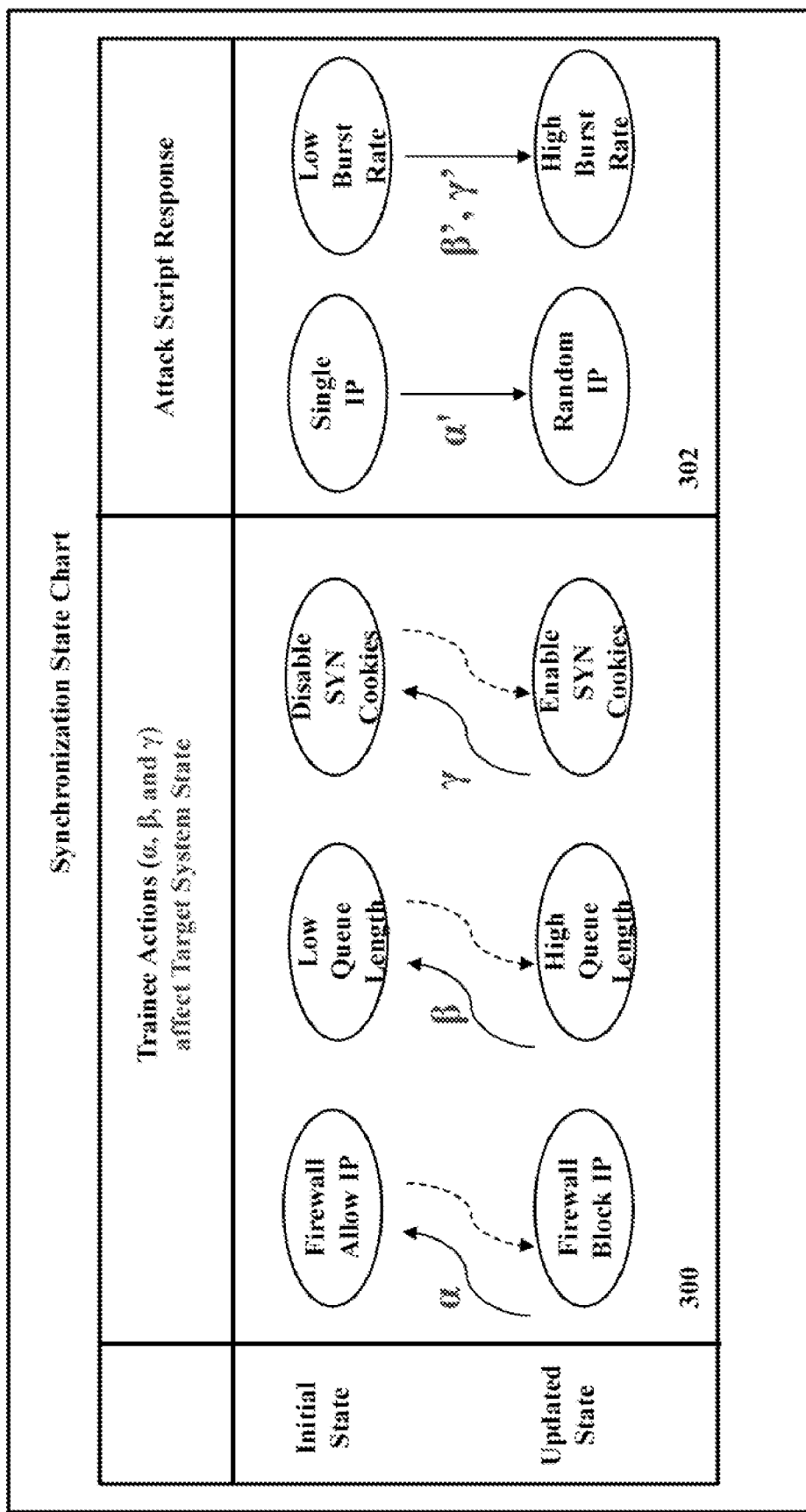
FIGS. 3A-B are conceptual diagrams illustrating a non-limiting example of actions and corresponding responses that may be performed by a cyber-attack training computer system, according to one embodiment.
Figure 3B:
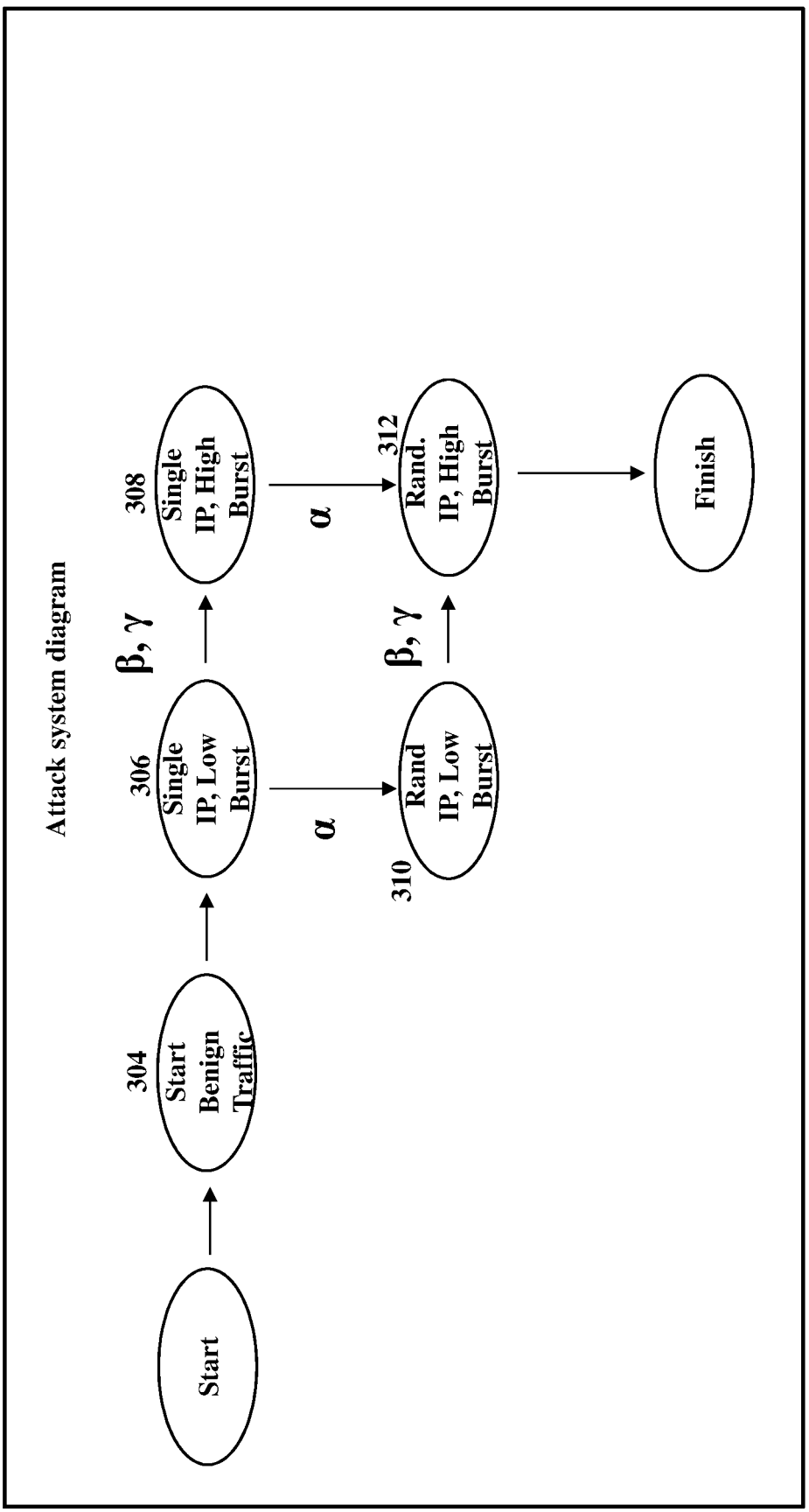

FIGS. 3A-3B are conceptual diagrams illustrating non-limiting examples of actions and corresponding responses that may be taken by one or more of the systems described herein. In FIGS. 3A-3B, the analytics server executes a cyber-attack training exercise that includes one or more scenarios related to a denial-of-service (DoS) attack by a virtual attack machine against a virtual target machine. For example, the DoS attack may start as a single-source attack against one server. Depending on trainee responses monitored and collected by the analytics server, the virtual attack machine may upgrade the DoS attack to a distributed DoS attack.

In this example, the virtual attack machine may provide an attack network that controls one or more attack machines to route traffic between the virtual attack machine and the virtual target machine. The attack machines may route both malicious traffic and benign background traffic. In this example, benign traffic remains at a constant level but malicious traffic patterns are dynamically changed. The analytics server may model the virtual target machine to include a firewall/router and multiple web servers in a subnet that are to be protected.

In the example of a DoS attack, the trainee may have various objectives or missions to complete during the exercise. For example, the trainee may need to detect the attack and/or make specific observations about the attack. The trainee may also attempt to re-establish any lost connectivity and/or block the attack at the firewall or at the web server sites. In addition, the trainee may also try to avoid taking any negative actions that would break any existing connections. Actions taken and responses inputted by the trainee computer may occur within the virtual system within (e.g., instantiated by) the analytics server. This ensures that other computing systems operatively connected to the analytics server are not harmed by any actions performed by the trainee or the virtual attack machine.

FIG. 3A illustrates an example synchronization state chart demonstrating how a change in state in one system causes a synchronized state change in another system. Portion 300 of the chart conceptually shows actions that may be taken by the trainee during the DoS attack exercise. These actions, which are labeled α, β, and γ, affect the state of the virtual target machine that is being protected by the trainee. When the exercise begins, the virtual target machine has an initial state. In this initial state, the virtual target machine includes a firewall (implemented by one or more of virtual machines) that allows communication from an external IP address provided by an attack machine of the virtual attack machine. The virtual target machine also includes a low queue length to process incoming traffic, and disables SYN cookies in the initial state. In this example, SYN cookies are used to guard against SYN flood attacks when TCP (Transmission Control Protocol) connections are used.

However, as noted above, the trainee can take one or more actions α, β, and γ during the course of the training exercise, which will affect the state of virtual target machine. Portion 300 of state chart shows an updated (or final) state that results from the trainee taking one or more of these actions. For example, if the trainee performs action α to cause the firewall to block a particular IP address within virtual attack machine, the trainee has caused the virtual target machine to change state. If the trainee performs action β to cause the queue to have a high queue length, the virtual target machine accordingly has a new "updated" state. Moreover, if the trainee performs action γ to enable SYN cookies, the virtual target machine will accordingly reflect this updated state. As described above, the analytics server continuously monitors trainee actions and updates the virtual attack machine state and virtual target machine state in real-time or near real-time.

Portion 302 of the state chart shown in FIG. 3A shows the counter-responses identified by the analytics server and performed by the virtual attack machine. The synchronization of these responses to the trainees' actions are labeled by α', β', and γ' in portion 302. These responses affect the state of the virtual attack machine. In an initial state, the virtual attack machine uses a single IP address and uses a low burst rate of traffic for a DoS attack. If the trainee performs act α (block traffic from the IP address of the virtual attack machine), the analytics server executes the evaluation model and the AI model to identify a counter-response (e.g., subsequent step). As a result, the analytics server causes the virtual attack machine to respond by performing response α', which causes the virtual attack machine to use multiple, random IP addresses during the attack. If the trainee performs act β and/or γ (to reconfigure one or more machines of virtual target machine), the analytics server may use the evaluation methodologies described above to cause the virtual attack machine to respond by performing response β' and/or γ', respectively, and change from a low burst rate to a high burst rate of traffic.

The virtual attack machine is capable of dynamically and automatically using the AI model and the evaluation model to identify a best response to actions performed by the virtual target machine during the course of a DoS attack exercise. The virtual attack machine may initiate the attack in a particular fashion, but using the techniques described in FIG. 2, may intelligently respond to any corrective or preventive actions taken by the virtual target machine. In some configurations, the virtual attack machine may have different rule sets of varying difficulty levels. Thus, depending on the scenario or difficulty level selected by an instructor/administrator, the virtual attack machine may select an appropriate script to use during one or more scenarios of the training exercise.

FIG. 3B illustrates an example of a state diagram that conceptually shows the attack counter-responses of the virtual attack machine in response to actions taken by the virtual target machine. This diagram conveys information similar to FIG. 3A but in a different format. FIG. 3B illustrates state transitions and responses within the virtual attack machine in response to actions α, β, and γ that may be taken by the virtual target machine. Initially, the virtual attack machine starts by sending benign background traffic to virtual target machine (step 304). Then, the virtual attack machine starts sending initial malicious DoS traffic, comprising low-burst traffic from a single IP address associated with one of attack machines (step 306). If the virtual target machine performs act α in this state, to block traffic from the IP address, the analytics server execute the AI model and/or the evaluation model and determines a best counter response to act α. As a result, the virtual attack machine moves to a new state to begin sending low-burst traffic from multiple random IP addresses that are associated with multiple attack machine (step 310 or 312). However, if the virtual target machine performs acts β and/or γ in this state, to reconfigure one or more machines, the virtual attack machine moves to a state to send high-burst traffic from a single IP address (step 308).

To summarize FIGS. 3A-3B, if the virtual attack machine is in the state of sending low-burst traffic from multiple IP addresses, and virtual target machine performs acts β and/or γ, the virtual attack machine responds by sending high-burst traffic from random, multiple IP addresses. If the virtual attack machine is in the state of sending high-burst traffic from a single IP address, and the virtual target machine performs act α, the virtual attack machine responds by sending high-burst traffic from random, multiple IP addresses. Thus, as the trainees use the trainee computer to defend the virtual target machine and cause the virtual target machine to perform various corrective or preventive actions, these actions are detected and analyzed by the analytics server. In turn, the analytics server triggers a counter response that is dynamically generated and is not pre-scripted. As a result of the methods, systems, and embodiments described herein, the virtual attack machine is able to adapt its behavior based upon the actions taken by the trainee thereby creating a more immersive and realistic cyber-attack training exercise.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method comprising:
executing, by a server, a cyber-attack simulation protocol causing a virtual attack machine to engage in a simulated cyber-attack against a virtual target machine, where a user computer is configured to input a response to the execution of the cyber-attack simulation protocol on the virtual target machine, the simulated cyber-attack corresponding to an electronic file comprising a set of rules;
collecting, by the server, data associated with the cyber-attack simulation protocol by continuously monitoring the virtual target machine, virtual attack machine, and response inputted by the user computer;
executing, by the server, a first model configured to generate a first evaluation of a trainee action based on the collected data, historical cyber-attack data, and the set of rules to determine a first subsequent cyber-attack action for the virtual attack machine in the cyber-attack simulation protocol based on the first evaluation of the trainee action;
executing, by the server, a second model configured to generate a second evaluation of the trainee action based on the collected data, the historical cyber-attack data, and the set of rules to determine a second subsequent cyber-attack action for the virtual attack machine in the cyber-attack simulation protocol based on the second evaluation of the trainee action;
executing, by the server, a third model configured to generate a third evaluation of the trainee action using the first and second subsequent cyber-attack actions to determine a third subsequent cyber-attack action for the virtual attack machine in the cyber-attack simulation protocol based on the third evaluation of the trainee action, wherein the first model and third model are artificial intelligence models; and
executing, by the server, the third subsequent cyber-attack action by the virtual attack machine against the virtual target machine.

2. The method of claim 1, wherein the second model is an evaluation model comprising a set of rules and predetermined algorithms to determine the second subsequent cyber-attack action.

3. The method of claim 1, wherein using the first and second subsequent cyber-attack actions comprises:
selecting, by the server, the third subsequent cyber-attack action responsive to determining that the first subsequent cyber-attack action and the second subsequent cyber-attack action are incompatible.

4. The method of claim 3, further comprising:
training, by the server, the first model based on the selection of the third subsequent cyber-attack action.

5. The method of claim 1, further comprising:
generating, by the server, a score for the response submitted from the user computer.

6. The method of claim 1, further comprising:
monitoring cyber-attack notes inputted on the user computer.

7. The method of claim 1, wherein the first model comprises a neural network.

8. The method of claim 1, wherein the data collected and monitored is displayed in real-time on a dashboard of a monitoring computer.

9. A computer system comprising:
a virtual target machine;
a virtual attack machine;
a user computer in communication with the virtual target machine;
a server configured to instantiate the virtual target machine and the virtual attack machine, the server in communication with the user computer, wherein the server is configured to:
execute a cyber-attack simulation protocol causing the virtual attack machine to engage in a simulated cyber-attack against the virtual target machine, where the user computer is configured to input a response to execution of the cyber-attack simulation protocol on the virtual target machine, the simulated cyber-attack corresponding to an electronic file comprising a set of rules;
collect data associated with the cyber-attack simulation protocol by continuously monitoring the virtual target machine, virtual attack machine, and responses inputted by the user computer;

execute a a first model configured to generate a first evaluation of a trainee action based on the collected data, historical cyber-attack data, and the set of rules to determine a first subsequent cyber-attack action for the virtual attack machine in the cyber-attack simulation protocol based on the first evaluation of the trainee action;

execute a second model configured to generate a second evaluation of the trainee action based on the collected data, historical cyber-attack data, and the set of rules to determine a second subsequent cyber-attack action for the virtual attack machine in the cyber-attack simulation protocol based on the second evaluation of the trainee action;

execute a third model configured to generate a third evaluation of the trainee action using the first and second subsequent cyber-attach actions to determine a third subsequent cyber-attack action for the virtual attack machine in the cyber-attack simulation protocol based on the third evaluation of the trainee action, wherein the first model and the third model are artificial intelligence models; and execute the third subsequent cyber-attack action by the virtual attack machine against the virtual target machine.

10. The computer system of claim 9, wherein the second model is an evaluation model comprising a set of rules and predetermined algorithms to determine the second subsequent cyber-attack action.

11. The computer system of claim 9, wherein using the first and second subsequent cyber-attack actions comprises:
selecting the third subsequent cyber-attack action responsive to determining that the first subsequent cyber-attack action and the second subsequent cyber-attack action are incompatible.

12. The computer system of claim 9, wherein the server is further configured to:
train the first model based on the selection of the third subsequent cyber-attack action.

13. The computer system of claim 9, wherein the server is further configured to:
generate a score for the response submitted from the user computer.

14. The computer system of claim 9, wherein the server is further configured to:
monitor cyber-attack notes inputted on the user computer.

15. The computer system of claim 9, wherein the first model comprises a neural network.

16. The computer system of claim 9, wherein the data collected and monitored is displayed in real-time on a dashboard of a monitoring computer.

* * * * *